(12) United States Patent
Gulli et al.

(10) Patent No.: US 11,226,999 B2
(45) Date of Patent: Jan. 18, 2022

(54) SYSTEMS AND METHODS FOR PROVIDING RECOMMENDATIONS FOR ACADEMIC AND RESEARCH ENTITIES

(71) Applicant: ELSEVIER, INC., New York, NY (US)

(72) Inventors: Antonio Gulli, Pisa (IT); Maya Hristakeva, London (GB); Kris Jack, London (GB)

(73) Assignee: ELSEVIER, INC., New York, NY (US)

( * ) Notice: Subject to any disclaimer, the term of this patent is extended or adjusted under 35 U.S.C. 154(b) by 131 days.

(21) Appl. No.: 16/151,402

(22) Filed: Oct. 4, 2018

(65) Prior Publication Data

US 2019/0108275 A1   Apr. 11, 2019

Related U.S. Application Data

(60) Provisional application No. 62/568,943, filed on Oct. 6, 2017.

(51) Int. Cl.
*G06F 16/33*     (2019.01)
*G06N 20/00*    (2019.01)
*G06F 16/338*   (2019.01)
*G06F 16/332*   (2019.01)
*G06F 16/335*   (2019.01)

(52) U.S. Cl.
CPC ......... *G06F 16/334* (2019.01); *G06F 16/335* (2019.01); *G06F 16/338* (2019.01); *G06F 16/3322* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 6,681,247 B1 * | 1/2004 | Payton | G06F 16/284 |
| | | | 709/217 |
| 2002/0165860 A1 * | 11/2002 | Glover | G06F 16/951 |
| 2005/0114789 A1 * | 5/2005 | Chang | G06F 16/954 |
| | | | 715/779 |

(Continued)

FOREIGN PATENT DOCUMENTS

EP     2506152 A1     3/2010

OTHER PUBLICATIONS

PCT International Search Report and Written Opinion of the International Searching Authority for PCT/US2018/054280, dated Feb. 19, 2019, 13 pages.

(Continued)

*Primary Examiner* — Uyen T Le
(74) *Attorney, Agent, or Firm* — Dinsmore & Shohl LLP

(57) ABSTRACT

Systems, methods, and readable memory for providing recommendations. A method includes receiving data corresponding to one or more user interactions with a user interface, where the one or more user interactions indicate a research topic, searching one or more databases for references relating to the research topic, extracting names from the references, the names corresponding to potential collaborators, placing the names into a ranked list, where the names are arranged in the ranked list according to a predicted relevance to a user, and providing the ranked list via the user interface to the user.

18 Claims, 7 Drawing Sheets

(56) References Cited

U.S. PATENT DOCUMENTS

| | | | |
|---|---|---|---|
| 2010/0169365 A1 | 7/2010 | Chupp et al. | |
| 2010/0180213 A1* | 7/2010 | Karageorgos | G06F 40/174 |
| | | | 715/753 |
| 2012/0023046 A1* | 1/2012 | Verma | G06Q 30/0201 |
| | | | 706/12 |
| 2012/0041769 A1 | 2/2012 | Dalal et al. | |
| 2014/0032306 A1* | 1/2014 | Sukornyk | G06Q 30/0269 |
| | | | 705/14.43 |
| 2014/0136439 A1 | 5/2014 | Galvin, Jr. et al. | |
| 2015/0081802 A1* | 3/2015 | Borenstein | G06F 16/22 |
| | | | 709/206 |
| 2015/0193551 A1 | 7/2015 | Gordon et al. | |
| 2015/0294019 A1* | 10/2015 | Chakra | G06F 16/955 |
| | | | 707/754 |
| 2015/0382039 A1* | 12/2015 | Lewis | H04N 21/4788 |
| | | | 725/28 |
| 2016/0026720 A1* | 1/2016 | Lehrer | G06F 16/23 |
| | | | 707/710 |
| 2017/0148123 A1 | 5/2017 | Ather | |
| 2017/0206270 A1* | 7/2017 | Bufe, III | G06F 16/9535 |

OTHER PUBLICATIONS

Extended European Search Report for European Application No. 18864068.4 dated Sep. 28, 2020, 9 pages.

\* cited by examiner

SYSTEMS AND METHODS FOR PROVIDING RECOMMENDATIONS FOR ACADEMIC AND RESEARCH ENTITIES

CROSS-REFERENCE TO RELATED APPLICATION

The present application claims priority to U.S. Provisional Patent Application Ser. No. 62/568,943, filed Oct. 6, 2017 and entitled "Systems and Methods for Providing Recommendations for Academic and Research Entities," the entire contents of which is incorporated herein in its entirety.

TECHNICAL FIELD

The present specification generally relates systems and methods for providing a recommendation and, more specifically, to systems and methods for providing a recommendation of one or more researchers to a user for a research project.

BACKGROUND

Researchers commonly collaborate with one another for research projects and/or seek out other researchers working in the same field to further their studies. However, some researchers may not be known to others. Certain systems have sought to solve this issue by providing recommendations to users for other researchers based on one or more criteria. However, such recommendations tend to be more generalized recommendations and are not sufficiently personalized for each individual, which results in a list of researchers that is inaccurate, does not accurately reflect certain preferences of the individual, and does not appropriately rank or re-rank recommended collaborators based on the preferences.

SUMMARY

In one embodiment, a method of providing recommendations to a user includes receiving data corresponding to one or more user interactions with a user interface, where the one or more user interactions indicate a research topic, searching one or more databases for references relating to the research topic, extracting a plurality of names from the references, the plurality of names corresponding to a plurality of potential collaborators, placing the plurality of names into a ranked list, where the plurality of names are arranged in the ranked list according to a predicted relevance to a user, and providing the ranked list via the user interface to the user.

In another embodiment, a system for providing recommendations to a user includes a processing device and a non-transitory, processor-readable storage medium coupled to the processing device. The non-transitory, processor-readable storage medium includes one or more programming instructions thereon that, when executed, cause the processing device to receive data corresponding to one or more user interactions with a user interface, where the one or more user interactions indicate a research topic, search one or more databases for references relating to the research topic, extract a plurality of names from the references, the plurality of names corresponding to a plurality of potential collaborators, place the plurality of names into a ranked list, where the plurality of names are arranged in the ranked list according to a predicted relevance to a user, and provide the ranked list via the user interface to the user.

In yet another embodiment, a non-transitory, processor-readable storage medium programmed to provide recommendations to a user includes one or more programming instructions that are executable to receive data corresponding to one or more user interactions with a user interface, where the one or more user interactions indicate a research topic, search one or more databases for references relating to the research topic, extract a plurality of names from the references, the plurality of names corresponding to a plurality of potential collaborators, place the plurality of names into a ranked list, where the plurality of names are arranged in the ranked list according to a predicted relevance to a user, and provide the ranked list via the user interface to the user.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are generally directed to systems and methods for providing a dynamically ranked recommendation list of potential collaborators and/or researchers to a user. The systems and methods described herein generate scores that are provided in a particular user interface that ranks researchers with respect to a particular user of the particular user interface. Because of the methods described herein, the ranking is more accurate and personalized than previous attempts to recommend researchers.

Such scores are generally calculated based on the user's past activity with respect to articles (e.g., adding an article to a personal library, publishing an article, etc.) in combination with items that are similar to the articles. After this initial ranking of the researcher list, the list is dynamically re-ranked according to one or more additional criteria to generate a more personalized ranking.

In some embodiments, the systems and methods described herein may be an item-based collaborative filtering system that, given the articles in a user's library, generates a set of candidate researchers. The particular part of the item-based collaborative filtering system is that it generates scores based on the users' past article activity (e.g., added to the library, published) in combination with items that are similar to them, where similarity is defined as cosine similarity between article co-activity across users. This can initially be used for ranking, but that ranking is often changed in later states of the recommendation pipeline.

While the present disclosure generally refers to providing a ranked recommendation list of researchers, collaborators, and/or the like, it is not limited to such. For example, the ranked recommendation list may be for other individuals or entities, such as potential employers, potential colleagues, potential business connections, and/or the like. Other individuals or entities that may be ranked according to the systems and methods described herein are contemplated.

Figure 1:
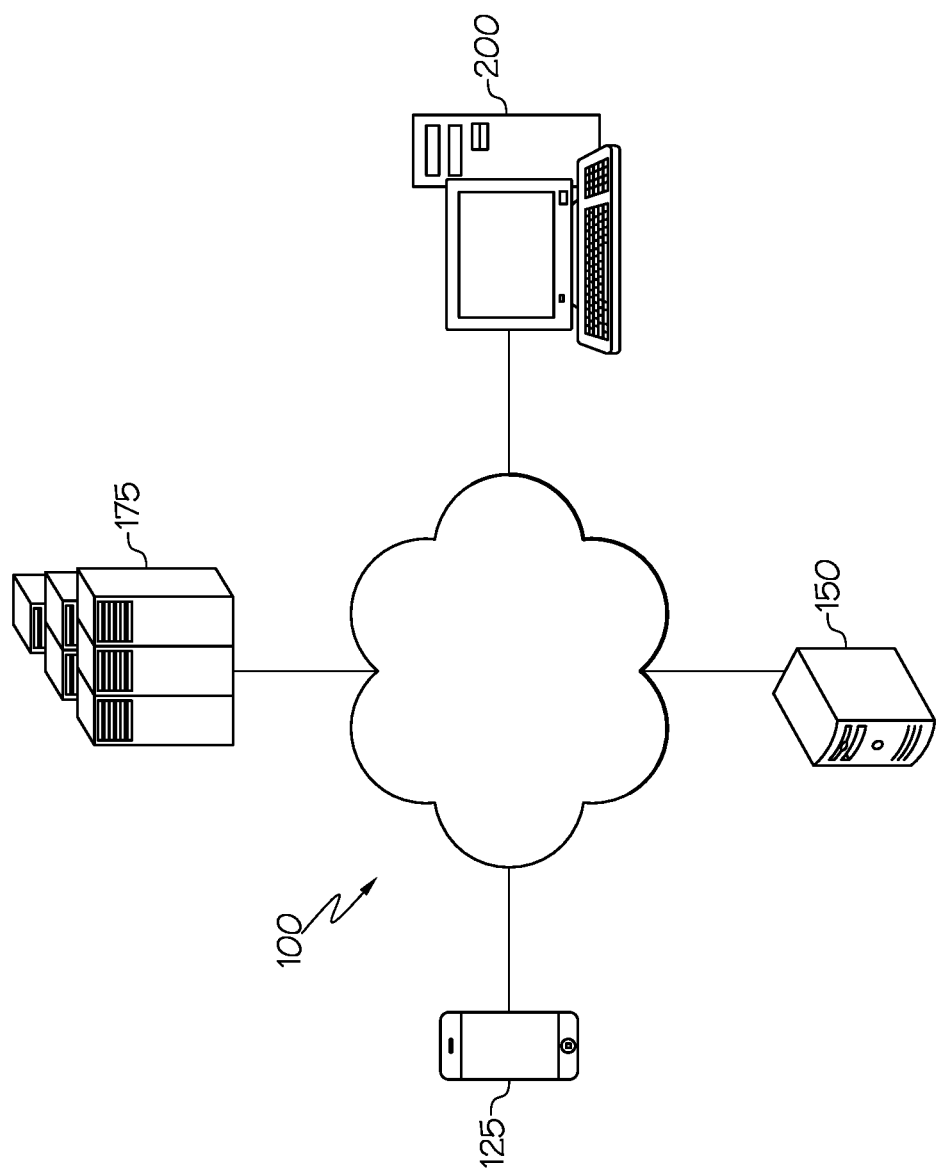
FIG. 1 schematically depicts an illustrative computing network according to one or more embodiments shown and described herein.

Referring now to the figures, FIG. 1 depicts an illustrative computing network that depicts components for a system that provides a dynamically ranked list of potential collaborators according to embodiments shown and described herein. As illustrated in FIG. 1, a computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, a user computing device 200, a mobile computing device 125, a server computing device 150, and/or one or more data repositories 175.

The mobile computing device 125 and the user computing device 200 may each generally be used as an interface between a user the other components connected to the computer network 100, and/or various other components communicatively coupled to the mobile computing device 125 and/or the user computing device 200 (such as components communicatively coupled via one or more networks to the mobile computing device 125 and/or the user computing device 200), whether or not specifically described herein. Thus, the mobile computing device 125 and/or the user computing device 200 may be used to perform one or more user-facing functions, such as receiving one or more inputs from a user or providing information to the user. For example, the mobile computing device 125 and/or the user computing device may receive user inputs that correspond to searching for research articles, publishing an article, conducting searches, and/or the like that are subsequently used to provide a dynamically ranked recommendation list as described herein. Additionally, in the event that the server computing device 150 requires oversight, updating, or correction, the mobile computing device 125 and/or the user computing device 200 may be configured to provide the desired oversight, updating, and/or correction. The mobile computing device 125 and/or the user computing device 200 may also be used to input additional data into a data storage portion of the server computing device 150. For example, a user may use the mobile computing device 125 and/or the user computing device 200 to upload a publication authored by the user to the server computing device 150 (e.g., upload a publication for peer review).

The server computing device 150 may receive electronic data and/or the like from one or more sources (e.g., the mobile computing device 125, the user computing device 200, and/or one or more databases), direct operation of one or more other devices (e.g., the mobile computing device 125 and/or the user computing device 200), collect data from one or more sources (e.g., data relating to a user's online history, publicly available data, data from a reference management software program, etc.), store data relating to potential collaborators/researchers, and/or the like.

The one or more data repositories 175 may generally store data that is used for the purposes of ranking and/or re-ranking recommendations, as described herein. In some embodiments, the data contained within the one or more data repositories 175 may be third party servers that contain information that can be used for the purposes of providing a dynamically ranked recommendation list, which are accessible via an application programming interface (API) or the like by the server computing device 150, the user computing device 200, and/or the mobile computing device 125. For example, the one or more data repositories 175 may include one or more personal libraries of a particular user from a reference manager such as, for example, the Mendeley reference management software provided by Elsevier Inc. (New York, N.Y.). In some embodiments, data may be directly obtained from the one or more data repositories 175 automatically and continuously for the purposes of carrying out the processes described herein. In other embodiments, data may be copied from the one or more data repositories 175 to the server computing device 150 for the purposes of carrying out the processes described herein.

It should be understood that while the user computing device 200 is depicted as a personal computer, the mobile computing device 125 depicted as a smartphone, and the server computing device 150 and the one or more data repositories 175 are depicted as servers, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 200, the mobile computing device 125, and the server computing device 150 may represent a plurality of computers, servers, databases, mobile devices, components, and/or the like. Similarly, the one or more data repositories 175 may be a single computer, server, database, mobile device, component, and/or the like.

Figure 2:
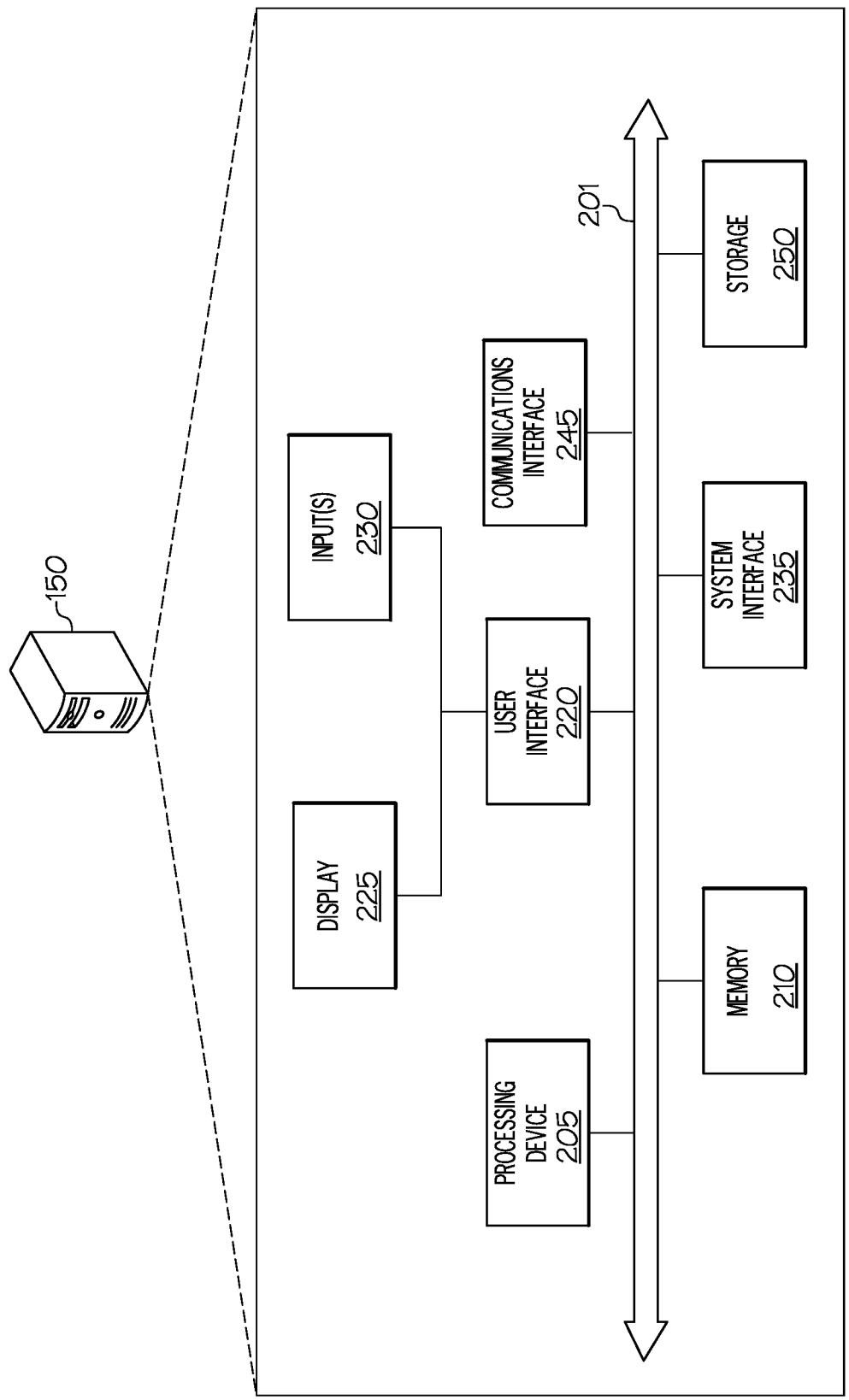
FIG. 2 schematically depicts a block diagram of illustrative hardware of a server computing device according to one or more embodiments shown and described herein.

Illustrative hardware components of the server computing device 150 are depicted in FIG. 2. A bus 201 may interconnect the various components. A processing device 205, such as a computer processing unit (CPU), may be the central processing unit of the computing device, performing calculations and logic operations required to execute a program. The processing device 205, alone or in conjunction with one or more of the other elements disclosed in FIG. 2, is an illustrative processing device, computing device, processor, or combination thereof, as such terms are used within this disclosure. Memory 210, such as read only memory (ROM) and random access memory (RAM), may constitute an illustrative memory device (i.e., a non-transitory processor-readable storage medium). Such memory 210 may include one or more programming instructions thereon that, when executed by the processing device 205, cause the processing device 205 to complete various processes, such as the processes described herein. In some embodiments, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

In some embodiments, the program instructions contained on the memory 210 may be embodied as a plurality of software logic modules, where each logic module provides programming instructions for completing one or more tasks. For example, certain software logic modules may be used for the purposes of providing a user interface, collecting information from a user, collecting information from non-user sources, determining a list of potential collaborators as a result of collected information, ranking the list, re-ranking the list, providing the list, and/or the like. Additional details regarding the logic modules will be discussed herein with respect to FIG. 3.

Still referring to FIG. 2, a storage device 250, which may generally be a storage medium that is separate from the memory 210, may contain one or more data repositories for storing data that is used for determining a list of potential collaborators, ranking the list, and re-ranking the list. The storage device 250 may be any physical storage medium, including, but not limited to, a hard disk drive (HDD), memory, removable storage, and/or the like. While the storage device 250 is depicted as a local device, it should be understood that the storage device 250 may be a remote storage device, such as, for example, a server computing device, the one or more data repositories 175 (FIG. 1) or the like. Additional details regarding the types of data stored within the storage device 250 are described with respect to FIG. 4.

Still referring to FIG. 2, a user interface 220 may permit information from the bus 201 to be displayed on a display 225 portion of the computing device in audio, visual, graphic, or alphanumeric format in some embodiments. In some embodiments, the user interface 220 may also include one or more input devices 230 that allow for transmission to and receipt of data from input devices such as a keyboard, a mouse, a joystick, a touch screen, a remote control, a pointing device, a video input device, an audio input device, a haptic feedback device, and/or the like. Such a user interface 220 may be used, for example, to allow a user to interact with the server computing device 150 or any component thereof.

A system interface 235 may generally provide the server computing device 150 with an ability to interface with one or more of the components of the computer network 100 (FIG. 1). Still referring to FIG. 2, communication with such components may occur using various communication ports (not shown). An illustrative communication port may be attached to a communications network, such as the Internet, an intranet, a local network, a direct connection, and/or the like.

A communications interface 245 may generally provide the server computing device 150 with an ability to interface with one or more external components outside the computer network 100 (FIG. 1), such as, for example, an external computing device, a remote server, and/or the like. Communication with external devices may occur using various communication ports (not shown). An illustrative communication port may be attached to a communications network, such as the Internet, an intranet, a local network, a direct connection, and/or the like.

It should be understood that the components illustrated in FIG. 2 are merely illustrative and are not intended to limit the scope of this disclosure. More specifically, while the components in FIG. 2 are illustrated as residing within the server computing device 150, this is a nonlimiting example. In some embodiments, one or more of the components may reside external to the server computing device 150, either within one or more of the components described with respect to FIG. 1, other components, or as standalone components. Similarly, one or more of the components may be embodied in other computing devices not specifically described herein. In addition, while the components in FIG. 2 relate particularly to the server computing device 150, this is also a nonlimiting example. That is, similar components may be located within the mobile computing device 125, the one or more data repositories 175, and/or the user computing device 200 (FIG. 1) without departing from the scope of the present disclosure.

Figure 3:
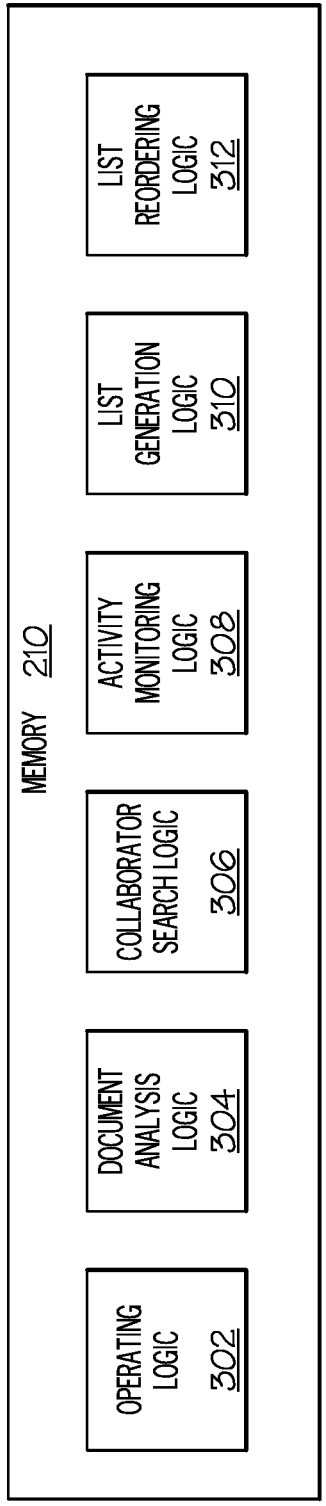
FIG. 3 schematically depicts a block diagram of illustrative modules within a memory component of a server computing device according to one or more embodiments shown and described herein.

Referring now to FIG. 3, illustrative logic modules that may be contained within the memory component 210 are depicted. The logic modules may include, but are not limited to, operating logic 302, document analysis logic 304, collaborator search logic 306, activity monitoring logic 308, list generation logic 310, and/or list reordering logic 312.

The operating logic 302 may include an operating system and/or other software for managing components of the server computing device 150 (FIG. 2). That is, the operating logic 302 may generally contain programming that allows the server computing device 150 (FIG. 2) to generally function, interface with a user and/or other computing devices, and/or provide a platform for completing the various processes described herein.

The document analysis logic 304 generally contains programming instructions for analyzing documents and extracting information therefrom. That is, the document analysis logic 304 may include programming for scanning the text of an electronic document, determining one or more names from the document (including author names, names of authors in citations within the document, mentions of other people, and/or the like), one or more document topics, and/or the like. In some embodiments, the document analysis logic 304 may be a machine learning (ML) module that is programmed to learn how to recognize names, topics, and/or the like in various documents.

The collaborator search logic 306 generally contains programming instructions for searching repositories for a potential collaborator's name, including repositories that contain published articles, books, websites, and/or the like. More specifically, the collaborator search logic 306 may receive a name input as a result of the names generated from the document analysis logic 304, determine one or more databases to search, and search the one or more databases for references containing the name.

The activity monitoring logic 308 generally contains programming instructions for monitoring one or more inputs received from a user at a user interface (e.g., the mobile computing device 125 and/or the user computing device 200 in FIG. 1) and determining a user's actions from the one or more inputs. For example, the activity monitoring logic 308 may monitor inputs such as mouse clicks, mouse scroll actions, mouse movement actions, keyboard inputs, joystick inputs, physical touch inputs, and/or the like. In some embodiments, the activity monitoring logic 308 may determine where a user clicks (or otherwise selects) an item within a user interface, how long a user views a particular page (or portion thereof) provided within a user interface, how quickly or slowly the user scrolls through a page, whether a user moves forward or backward between particular pages, what content a user is viewing, a time and day of user activity, and/or the like.

Still referring to FIG. 3, the list generation logic 310 generally contains programming to generate a ranked recommendation list of potential collaborators and/or researchers. That is, the list generation logic 310 may complete one or more processes that include receiving information regarding potential collaborators and/or researchers, receiving information regarding the user and/or particular research topics, and providing a ranked list of the potential collaborators and/or researchers based on the received information.

The list reordering logic 312 generally contains programming to reorder the ranked recommendation list generated by the list generation logic 312 as additional information is received. As such, the list reordering logic 312 may also complete one or more processes that include receiving information, determining adjustments to the ranked list based on the received information, and adjusting the ranked list dynamically as further information is received.

The logic modules depicted with respect to FIG. 3 are merely illustrative. As such, it should be understood that additional or fewer logic modules may also be included within the memory 210 without departing from the scope of the present disclosure. In addition, certain logic modules may be combined into a single logic module and/or certain logic modules may be divided into separate logic modules in some embodiments.

Figure 4:
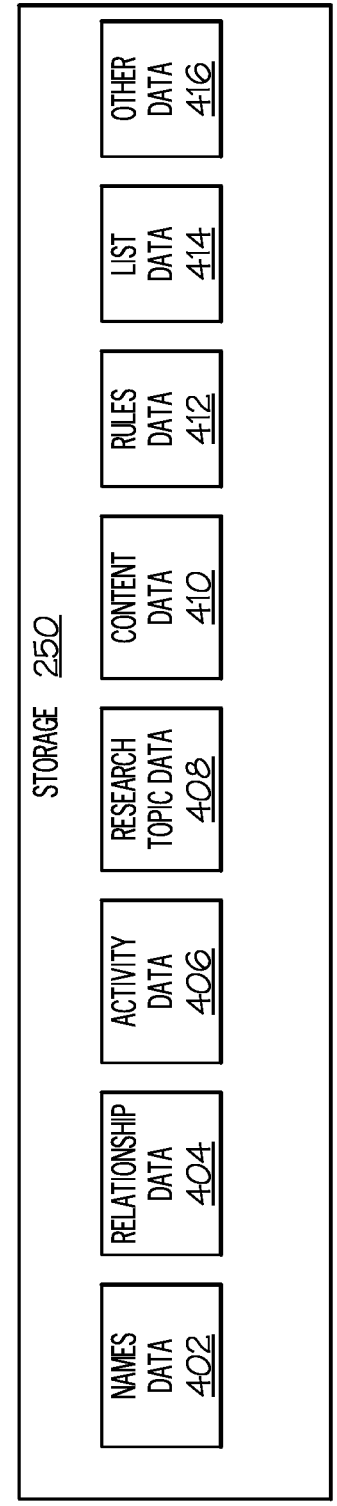
FIG. 4 schematically depicts a block diagram of illustrative data contained within a storage device of a server computing device according to one or more embodiments shown and described herein.

Referring now to FIG. 4, illustrative types of data that may be contained within the storage device 250 are depicted. The types of data may include, but are not limited to, names data 402, relationship data 404, activity data 406, research topic data 408, content data 410, rules data 412, list data 414, and/or other data 416.

The names data 402 is generally data pertaining to potential collaborators and/or researchers. The names data 402 may include a name of an individual, a name of a collective (e.g., name of a laboratory including a plurality of individuals), a name of university or other educational institution, a name of a government entity, a name of a funding body, a name of a financial institution, and/or the like. The names data 402 may be used for the purposes of generating and/or updating a dynamically ranked list, as described in greater detail herein.

The relationship data 404 is generally data pertaining to relationships between particular names. For example, all authors on a particular research paper may be indicated as having a relationship with one another within the relationship data 404. In another example, a funding body and a recipient of funds may be indicated as having a relationship with one another within the relationship data 404. In yet another example, researchers that work at the same university, in the same laboratory, within the same collective, and/or the like may be indicated as having a relationship with one another within the relationship data 404. In some embodiments, the relationship data 404 may indicate a degree of relationship. That is, two entities that have a direct relationship with each other (e.g., co-authors on a research paper) may have a first degree relationship whereas two entities that are related through a third entity (e.g., the third entity has co-authored papers with each of the two entities, but the two entities have never co-authored together) may have a second degree relationship. In some embodiments, the relationships within the relationship data 404 may be weighted based on particular factors. For example, the relationship of co-authors of ten (10) different research papers may be weighted more heavily than the relationship of co-authors of a single research paper. In another example, a first degree relationship may be weighted more heavily than a second degree relationship.

The activity data 406 is generally data pertaining to a user's interaction with a user interface (e.g., interaction with the mobile computing device 125 and/or the user computing device 200 of FIG. 1). As such, data logs of a user's interaction may be stored as the activity data 406. Illustrative data includes, but is not limited to, data pertaining to mouse clicks, mouse scroll actions, mouse movement actions, keyboard inputs, joystick inputs, physical touch inputs, and/or the like. In some embodiments, the data within the activity data 406 may indicate where a user clicks (or otherwise selects) an item within a user interface, how long a user views a particular page (or portion thereof) provided within a user interface, how quickly or slowly the user scrolls through a page, whether a user moves forward or backward between particular pages, what content a user is viewing, a time and day of user activity, and/or the like.

The research topic data 408 is generally data that indicates particular research topics that relate to a particular name from the names data 402. For example, if a particular author writes ten (10) research papers on diabetes, the research topic data 408 may associate the name of the author with the topic of diabetes. Topics may generally be culled from an analysis of each document within a repository, as completed by the document analysis logic 304 (FIG. 3). As such, the topic may be determined through the use of machine learning. Still referring to FIG. 4, the research topic data 408 may be used to allow a user to select recommended collaborators and/or researchers based on a particular topic, as described in greater detail herein.

The content data 410 is generally information within the electronic documents that are used to extract topics and/or names, as described herein. That is, the content data 410 may include data from electronic journals, books, articles, other periodicals, websites, grant details, legislation, and/or the like. In some embodiments, the content data 410 may be used as a knowledge base for the purposes of training a machine learning algorithm for the purposes of recognizing names and/or topics within certain content. While the content data 410 is depicted in FIG. 4 as residing within the storage device 250, this is merely illustrative. In some embodiments, the content data 410 may be located remotely from the storage device 250, such as, for example, within the one or more data repositories 175 (FIG. 1).

The rules data 412 generally contains information relating to rules that are followed in generating and/or reordering dynamically ranked lists, as described herein. For example, the rules data 412 may include one or more rules followed by the list generation logic 310 and/or the list reordering logic 312 (FIG. 3) in generating and/or reordering a list. Still referring to FIG. 4, the rules data 412 may be created manually by a user and/or may be automatically created via a machine learning algorithm.

The list data 414 generally contains the lists that are created and/or reordered by the list generation logic 310 and/or the list reordering logic 312 (FIG. 3). Still referring to FIG. 4, the list data 414 may be accessible such that the dynamically ranked lists described herein can be displayed to a user via a user interface (e.g., via the mobile computing device 125 and/or the user computing device 200 depicted in FIG. 1). Still referring to FIG. 4, the list data 414 may also include hyperlinks and/or other means of allowing users to navigate to additional information embedded within the stored lists. For example, if a user clicks on a particular topic within a list of topics, the topic may open up a list of recommended collaborators and/or researchers for that particular topic, as described in greater detail herein.

The other data 416 may generally encompass any other data that may be generated and/or stored for the purposes of providing one or more dynamically ranked lists as described herein. For example, the other data 416 may include data pertaining to one or more personal libraries stored in a reference manager. The other data 416 may also include, for example, data pertaining to matching research topics, data pertaining to freshness of content, data pertaining to content popularity (e.g., citations or readership statistics), data pertaining to automatic topic and sentence detection, data pertaining to the addition of dithering noise, usage feedback signals (e.g., clicks), and/or the like.

Figure 5:
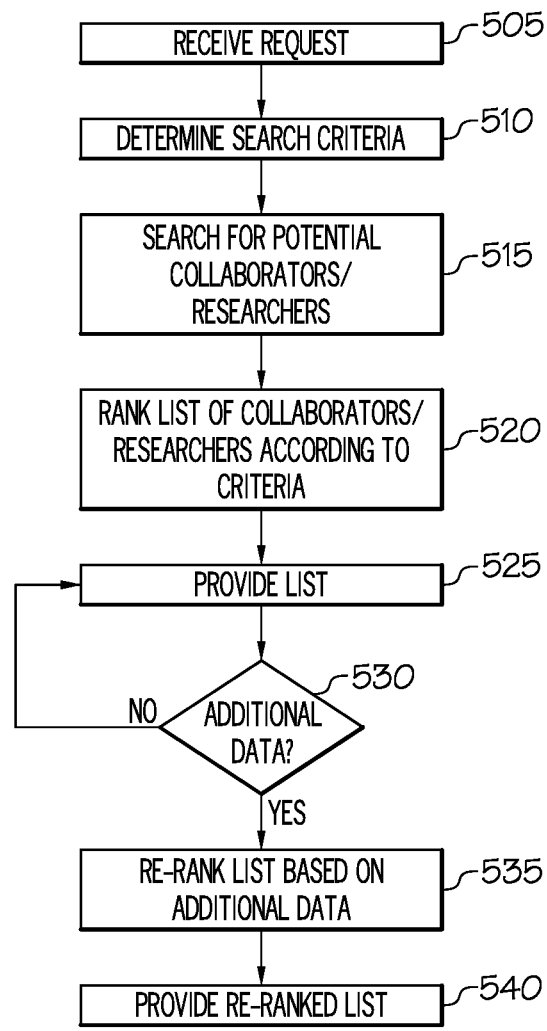
FIG. 5 depicts a flow diagram of an illustrative method of providing a ranked list of potential researchers as a result of a user request according to one or more embodiments shown and described herein.

FIG. 5 depicts a flow diagram of an illustrative method of providing a ranked list of potential collaborators based on a user request. Such a method may be completed by one or more devices and/or systems, such as the devices and/or systems described herein. Referring particularly to FIGS. 1 and 5, a request may be received at block 505. In some embodiments, the request may be received from the user via a user interface, such as a user interface on the mobile computing device 125 and/or the user computing device 200. The request may generally include a solicitation of information regarding potential collaborators and/or researchers. That is, the user may enter a search request to search for a particular list of potential collaborators and/or researchers for a particular topic. For example, a user may type the phrase "people I have not collaborated with in the field of neuroscience" as part of the search request. In another example, the user may access a particular interface that is used for the purposes of discovering collaborators, such as the interface shown and described herein with respect to FIGS. 7 and 8. Still referring to FIGS. 1 and 5, the user may click on a desired topic from a menu of topics in order to see a ranked list of recommended collaborators.

At block 510, the search criteria for searching for one or more collaborators and/or researchers to include in the ranked list may be determined. In some embodiments, the search criteria may be generated via a machine learning algorithm that has been trained to generate search terms based on user inputs, user history, and/or the like. For example, a determination may be based on, for example, articles the user has previously added to his/her personal library (e.g., electronically saved articles), articles the user has published, the user's browsing history, a user's time spent on a particular website or a portion thereof, actions a user has undertaken via a user interface (e.g., how quickly the user scrolls through a webpage or document, whether the user stops for a particular amount of time on a certain area of a web page or article), activity of similar users, and/or the like. In some embodiments, such a determination may be based on articles that a user has added to his/her personal library in a reference manager such as, for example, the Mendeley reference management software provided by Elsevier Inc. (New York, N.Y.). The specific search criteria may be keywords from those articles, author names, words describing one or more topics that have been determined via the machine learning algorithm, and/or the like. In some embodiments, the search criteria may be inputted by the user (e.g., the user may specify a particular topic for which a ranked list of collaborators and/or researchers is desired).

At block 515, a search may be conducted for potential collaborators and/or researchers using the information obtained. The search may be completed in such a manner so as to obtain a list of potential collaborators and/or researchers. For example, the one or more data repositories 175 may be searched using keyword searching, name searching, and/or any other type of searching now known or later developed. For example, if a search is generated to discover all publications related to the subject of breast cancer, the search results may return all names that are present on those publications that are related to the subject of breast cancer. That is, the names of authors, contributors, funding bodies, affiliated institutions, citations, names listed in cited documents, and/or the like may be returned as a result of the search. In another example, if a search is generated to discover all publications in which a particular individual is named, the search results may return all additional names that are present on those publications. The names may be extracted from the documents via a machine learning algorithm that has been trained to recognize names, as described herein. As a result of the search, an unranked list of names (including individuals, organizations, entities, and/or the like) may be generated. That is, any name that was present in a document returned as a result of the search may be placed in a list of names and initially may not appear in any particular order.

At block 520, the generated list of potential collaborators and/or researchers may be ranked according to one or more criteria. That is, the names are placed into a ranked list (e.g., the generated list is ranked) according to collaborators and/or researchers that are initially determined to be a best match with the user, a most likely match with the user, a preferred match with the user, and/or the like. Such an initial determination may be made by analyzing similarities between the user and each name on the list, analyzing relationships between the user and each name on the list, analyzing whether the user has collaborated with each name on the list in the past, determining a degree of relationship, weighting a relationship, determining a date and time of a relationship (e.g., when a particular paper was published by co-authors), matching research topics, determining freshness of content, determining content popularity (e.g., by citations or readership statistics), automatically detecting topics and sentences (e.g., via a machine learning algorithm), adding dithering noise, determining usage feedback signals (e.g., clicks), and/or the like.

Analyzing similarities between the user and each name on the list may include determining whether the user and the other named person or entity share a similar background, whether the user and the other named person work in similar fields of endeavor, whether the user and the other named person have conducted similar searching in the past, whether the user and other named person have saved similar articles to their respective personal libraries, and/or the like. Analyzing relationships between the user and each name on the list may include determining whether the user and the named person or entity were co-authors on previous documents, whether the user cited the named person or entity in a previous document, whether the user and the named person or entity have or had a business relationship, and/or the like. Analyzing whether the user has collaborated with each name on the list may include, in addition to determining whether the user and the named entity were listed as co-authors, determining whether the user and the named person or entity are or have been part of the same collective, group, university, research team, and/or the like. Determining a degree of relationship may generally include determining whether the user and the named person or entity are directly related (e.g., co-authors on the same publication), which is a first degree relationship, and/or determining whether the user and the named person or entity are indirectly related, and through how many additional named persons or entities, which may be second degree relationships, third degree relationships, fourth degree relationships, and so on. Relationships may also be weighted in some embodiments by determining the number of times a particular name in the list co-occurs with the user (e.g, a user and a named person or entity that have co-authored papers ten (10) times together may be weighted differently than a user and a named person or entity that have only co-authored papers one (1) time together).

The ranked list may then be generated based on all of the above-mentioned factors. For example, if a machine learning algorithm is trained to rank names that have second degree relationships with the user higher than names that have first degree relationships with the user, and to account for the time period in which the last relationship occurred, names that have second degree relationships that are relatively the most recent may be ranked the highest, names that have second degree relationships that are relatively the least recent may be ranked lower, and names that have first degree relationships may be ranked the lowest.

In some embodiments, the candidate set is ranked based on the user's relationship to the candidate researchers, ranking higher candidates with whom the user has previously co-authored and those who have authored articles that are in the users' personal libraries. Thus, a candidate that has previously collaborated with the user may be ranked higher than a candidate that has not previously collaborated with the user.

In some embodiments, the combination of ranking factors can happen with human defined rules. That is, a user, an administrator, and/or the like may provide definitions or guidelines that are used for the purposes of ranking. For example, if a user does not wish to see "Candidate X" in any ranked results, a rule may be set so "Candidate X" is automatically removed from all rankings.

In some embodiments, ranking according to block 520 may occur as a result of a combination of ranking factors. Such a combination of ranking factors may use one or more machine learning techniques that are based on ensembles of recommenders such as boosted trees or a neural network to combine the ranking factors for the purposes of ranking. In some embodiments, a combination of ranking factors may be based on a use of multistage sort (with bucketing/Discretization) to simplify the use of multiple signals.

Figure 8:
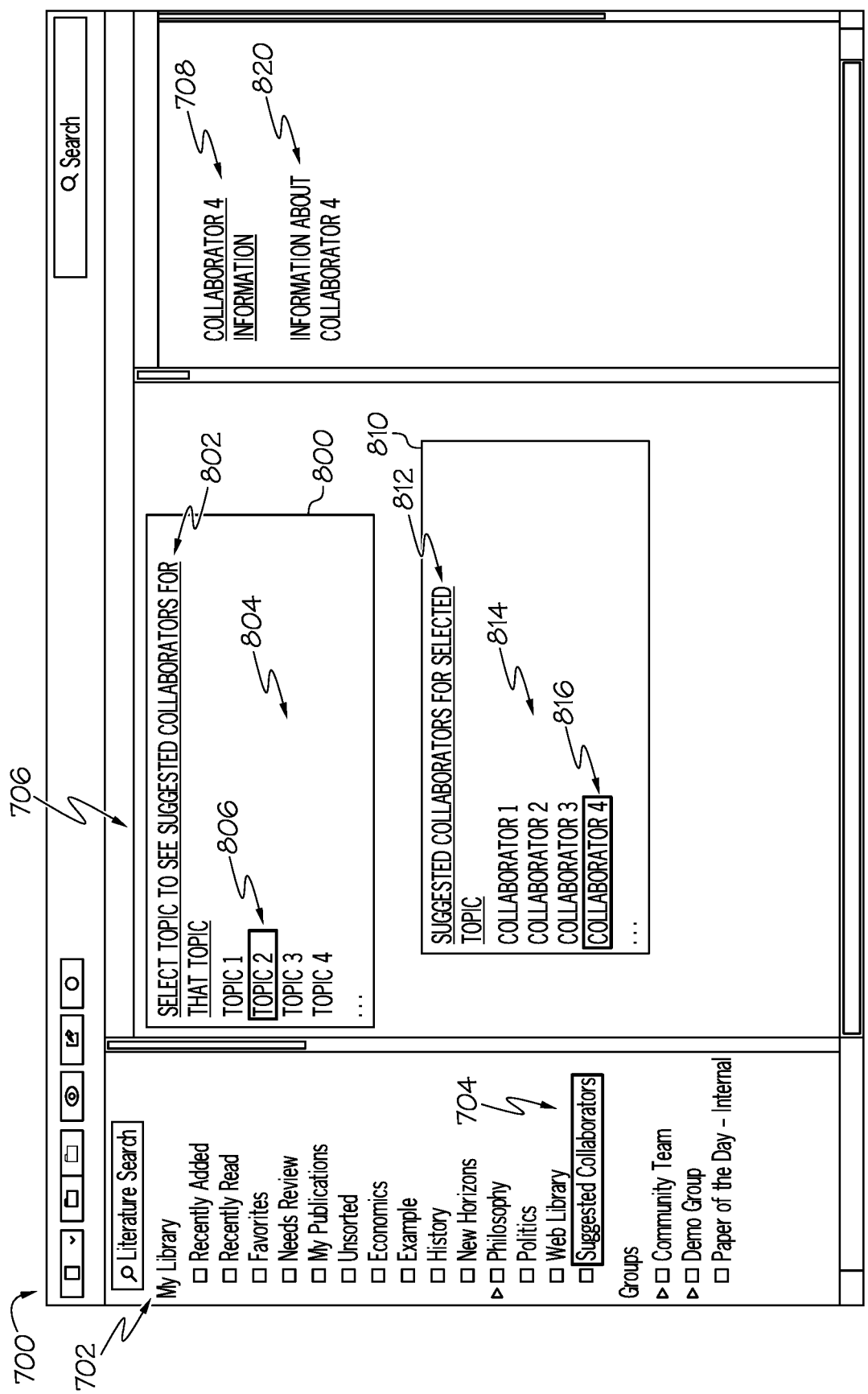
FIG. 8 depicts another illustrative user interface that provides a ranked list according to one or more embodiments shown and described herein.

Once the ranked list has been determined according to block 520, the ranked list is then provided to the user at block 525. For example, the ranked list may be provided as part of a user interface (e.g., via the mobile computing device 125 and/or the user computing device 200). An illustrative user interface that may be used to provide the ranked list is depicted in FIG. 8 and described in greater detail hereinbelow.

Still referring to FIGS. 1 and 5, to provide a dynamically ranked list (e.g., a list that is continuously updated to ensure that the ranking is fresh), the steps according to blocks 530-540 may be completed. As such, a determination may be made at block 530 as to whether additional data exists that can be used for re-ranking is obtained. Since data is constantly being obtained and added to the various storage components described herein, additional data may be added continuously. The additional data is not limited by this disclosure, and may generally be any data that can be used to dynamically re-rank the list, including data that is newly received (i.e., received after the initial list is generated). As described herein, examples include a user's relationship to candidate researchers, matching research topics, freshness of content, content popularity (either by citations or readership statistics), automatic topic and sentence detection, adding dithering noise, usage feedback signals (e.g., clicks), and/or the like.

If additional data does not exist, the originally ranked list is still provided to the user at block 525. If additional data does exist, the list is re-ranked at block 535 according to the additional data and is subsequently provided to the user at block 540. Re-ranking the data may be similar to the ranking process described hereinabove with respect to block 520. Because the re-ranking process is dynamic, the list may be re-ranked whenever new data that can be used for re-ranking is received. As such, it is ensured that the list provides the best possible suggestions to the user, and is constantly updated to ensure that the list always accurately represents a personalized list for that particular user.

In some embodiments, the candidate set may be re-ranked based on matching user's research topics. That is, if a candidate searches for the same research topics as a particular user, that particular user may see the candidate's name move upwards on the ranked list. In some embodiments, the candidate set may be re-ranked based on freshness of the content. That is, connections that were made years in the past may not be as relevant as connections that were made more recently. As such, newer connections may be re-ranked higher than older connections. In some embodiments, the candidate set may be re-ranked based on content popularity, where the popularity is expressed in terms of articles' citations in a given time window. In some embodiments, the candidate set may be re-ranked based on content popularity, where the popularity is expressed in terms of articles' readership statistics in a given time window from the library. In some embodiments, the candidate set may be re-ranked based on content popularity where the popularity is expressed in terms of articles' share operation in a given in a given time window from the library. In some embodiments, the candidate set may be re-ranked using automatic topic and sentences detection, such as latent dirichlet allocation on usage data (i.e. who reads what) rather than content (i.e. full text of article). In some embodiments, the candidate set may be re-ranked by using dithering noise to the algorithm, which permutes the results in such a way that the top few results have a high probability of remaining in the top few spots, but as one goes deeper into the results, the degree of mixing increases dramatically. In some embodiments, the candidate set may be re-ranked based on usage feedback signals (clicks) provided the users online when accessing the set of recommendation. For example, if a user repeatedly scrolls past a particular name, it may be determined that the user is not interested in that particular candidate, and thus the candidate's name may be moved further down the ranked list. This action may be a form of impression discounting to a scientific research recommender. Impression discounting takes the user's history of impressions (i.e. each time a recommendation is display/served to a user) in order to penalize items that have been recommended often but not interacted with.

Figure 6:
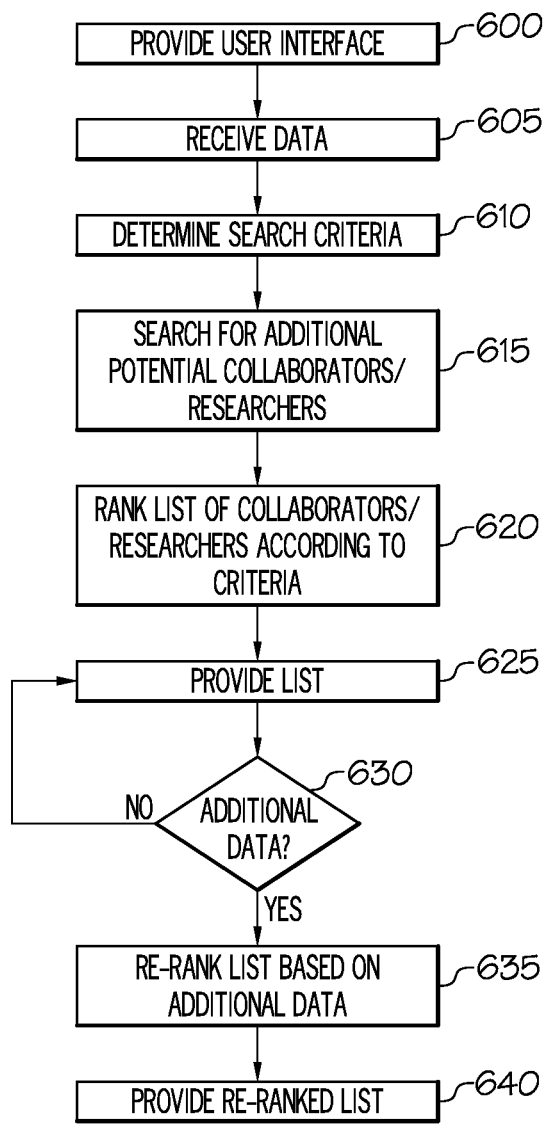
FIG. 6 depicts a flow diagram of an illustrative method of providing a ranked list of potential researchers as a result of user interaction with an interface according to one or more embodiments shown and described herein.
Figure 7:
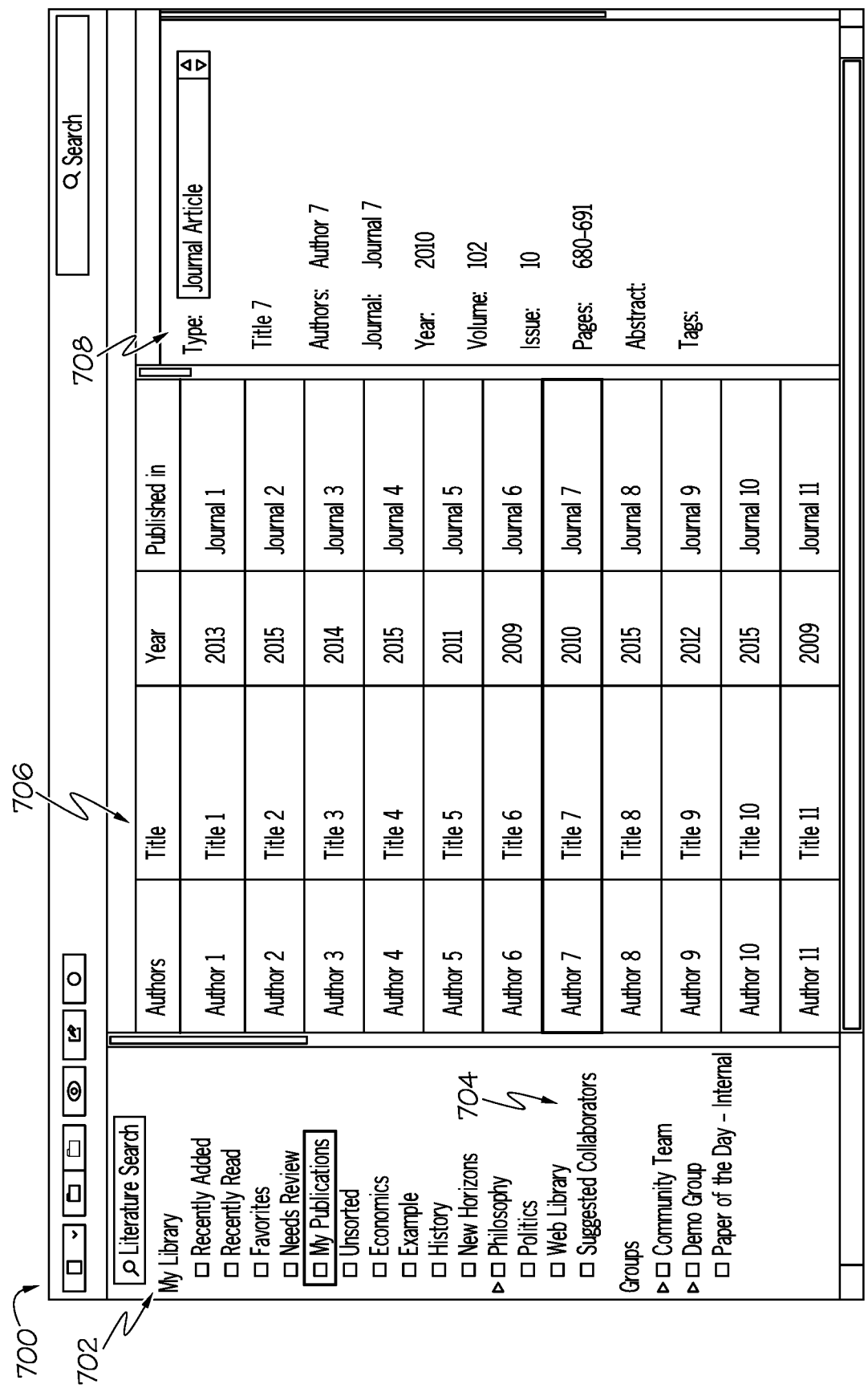
FIG. 7 depicts an illustrative user interface that provides a ranked list according to one or more embodiments shown and described herein.

FIG. 6 depicts a flow diagram of an illustrative method of providing a ranked list of potential collaborators based on user inputs within a user interface. Such a method may be completed by one or more devices and/or systems, such as the devices and/or systems described herein. Referring to FIG. 6, a user interface 600 may be provided. FIG. 7 depicts an illustrative user interface 700 that is presented to a user via the mobile computing device 125 and/or the user computing device 200 (FIG. 1). In some embodiments, the user interface 700 may be an integrated reference manager interface that also includes ranked list functionality such that, upon addition of a reference to the reference management software by a user, the systems and methods described herein automatically find researcher(s) from the reference that may be potential collaborators with the user and automatically provide information that includes the recommended potential collaborators as a ranked list, as described in greater detail herein. As such, the systems and methods described herein may provide a new combined user interface to a user that includes the references added to the reference management software together with the ranked list of potential collaborators.

Still referring to FIG. 7, the user interface 700 may include, for example, a selection pane 702, a list display pane 706, and/or a details display pane 708. The selection pane 702 may include folders or the like that a user can select to view lists of objects. For example, in the embodiment depicted in FIG. 7, the selection pane 702 includes a "suggested collaborators" selection 704. The list display pane 706 may generally provide a list of objects, such as, for example, references, names, and/or the like. In the embodiment depicted in FIG. 7, the list display pane 706 may generally display the author name, title of an article, publication year, and publication name in a list format for a group of selected publications. The details display pane 708 displays additional details about a selected one of the objects from the list display pane 706. In the embodiment depicted in FIG. 7, publication 7 in the list display pane 706 is selected, so additional details regarding publication 7 are depicted in the details display pane 708.

Referring to FIGS. 6-7, data may be received at block 605. More specifically, the data may generally relate to one or more user interactions with the user interface 700. For example, if the user interactions indicate that a ranked list of potential collaborators and/or researchers may be useful (e.g., if the user is browsing articles pertaining to a particular topic, searching for potential research ideas, or otherwise completing actions within the user interface 700 that indicate that the user might benefit from a list of potential collaborators and/or researchers), the user may be prompted as to whether he/she desires to see a ranked list. In another embodiment as depicted in FIG. 8, the user may click on the "suggested collaborators" selection 704, which results in a topic selection menu 800 being displayed within the list display pane 706. The topic selection menu 800 may provide a list of topics 804 and a prompt 802 for the user to select a topic for which suggested collaborators the user wishes to view. The topics may include topics that correspond to frequently viewed articles, webpages, and/or the like, most recently viewed topics, topics of previous research papers published by the user, and/or the like.

Referring again to FIG. 6, the search criteria for searching for one or more collaborators and/or researchers to include in the ranked list may be determined at block 610. In some embodiments, the search criteria may be generated via a machine learning algorithm that has been trained to generate search terms based on the inputs received via the user interface 700 (FIGS. 7-8), user history, and/or the like, as previously described herein. The specific search criteria may be keywords from those articles, author names, words describing one or more topics that have been determined via the machine learning algorithm, and/or the like.

Still referring to FIG. 6, a search may be conducted for potential collaborators and/or researchers using the information obtained at block 615. The search may be completed in such a manner so as to obtain a list of potential collaborators and/or researchers. For example, the one or more data repositories 175 (FIG. 1) may be searched using keyword searching, name searching, and/or any other type of searching now known or later developed, as previously described herein. The names may be extracted from the documents via a machine learning algorithm that has been trained to recognize names, as described herein. As a result of the search, an unranked list of names (including individuals, organizations, entities, and/or the like) may be generated. That is, any name that was present in a document returned as a result of the search may be placed in a list of names and initially may not appear in any particular order.

At block 620, the generated list of potential collaborators and/or researchers may be ranked according to one or more criteria. That is, the generated list may be ranked according to collaborators and/or researchers that are initially determined to be a best match with the user, a most likely match with the user, a preferred match with the user, and/or the like. Such an initial determination may be made by analyzing similarities between the user and each name on the list, analyzing relationships between the user and each name on the list, analyzing whether the user has collaborated with each name on the list in the past, determining a degree of relationship, weighting a relationship, determining a date and time of a relationship (e.g., when a particular paper was published by co-authors), matching research topics, determining freshness of content, determining content popularity (e.g., by citations or readership statistics), automatically detecting topics and sentences (e.g., via a machine learning algorithm), adding dithering noise, determining usage feedback signals (e.g., clicks) and/or the like.

Analyzing similarities between the user and each name on the list may include determining whether the user and the other named person or entity share a similar background, whether the user and the other named person work in similar fields of endeavor, whether the user and the other named person have conducted similar searching in the past, whether the user and other named person have saved similar articles to their respective personal libraries, and/or the like. Analyzing relationships between the user and each name on the list may include determining whether the user and the named person or entity were co-authors on previous documents, whether the user cited the named person or entity in a previous document, whether the user and the named person or entity have or had a business relationship, and/or the like. Analyzing whether the user has collaborated with each name on the list may include, in addition to determining whether the user and the named entity were listed as co-authors, determining whether the user and the named person or entity are or have been part of the same collective, group, university, research team, and/or the like. Determining a degree of relationship may generally include determining whether the user and the named person or entity are directly related (e.g., co-authors on the same publication), which is a first degree relationship, and/or determining whether the user and the named person or entity are indirectly related, and through how many additional named persons or entities, which may be second degree relationships, third degree relationships, fourth degree relationships, and so on. Relationships may also be weighted in some embodiments by determining the number of times a particular name in the list co-occurs with the user (e.g, a user and a named person or entity that have co-authored papers ten (10) times together may be weighted differently than a user and a named person or entity that have only co-authored papers one (1) time together).

The ranked list may then be generated based on all of the above-mentioned factors. For example, if a machine learning algorithm is trained to rank names that have second degree relationships with the user higher than names that have first degree relationships with the user, and to account for the time period in which the last relationship occurred, names that have second degree relationships that are relatively the most recent may be ranked the highest, names that have second degree relationships that are relatively the least recent may be ranked lower, and names that have first degree relationships may be ranked the lowest.

In some embodiments, the candidate set is ranked based on the user's relationship to the candidate researchers, ranking higher candidates with whom the user has previously co-authored and those who have authored articles that are in the users' personal libraries. Thus, a candidate that has previously collaborated with the user may be ranked higher than a candidate that has not previously collaborated with the user.

In some embodiments, the combination of ranking factors can happen with human defined rules. That is, a user, an administrator, and/or the like may provide definitions or guidelines that are used for the purposes of ranking. For example, if a user does not wish to see "Candidate X" in any ranked results, a rule may be set so "Candidate X" is automatically removed from all rankings.

In some embodiments, ranking according to block 620 may occur as a result of a combination of ranking factors. Such a combination of ranking factors may use one or more machine learning techniques that are based on ensembles of recommenders such as boosted trees or a neural network to combine the ranking factors for the purposes of ranking. In some embodiments, a combination of ranking factors may be based on a use of multistage sort (with bucketing/Discretization) to simplify the use of multiple signals.

Once the ranked list has been determined according to block 620, the ranked list is then provided to the user at block 625. For example, as shown in FIG. 8, when the user selects a particular topic, such as, for example, the "topic 2" selection 806, a ranked list submenu 810 may be displayed within the list display pane 706 as a result of the determining, searching, and ranking steps described herein. In the embodiment depicted in FIG. 8, the ranked list submenu 810 is displayed in an area below the topic selection menu 800. However, it should be understood that this location is merely illustrative. For example, the ranked list submenu 810 may appear laid over the topic list submenu in some embodiments. The ranked list submenu 810 may generally include the ranked list 814 and/or a prompt for the user to select a collaborator from the ranked list 814 to see additional information about the collaborator. For example, the "collaborator 4" selection 816 is selected in FIG. 8, which results in collaborator details 820 pertaining to collaborator 4 being displayed in the details display pane 708. The collaborator details 820 may include contact information for the collaborator, links to the collaborator's website and/or social media profile, an option to contact the collaborator directly in a messaging system provided via the user interface 700, and/or the like.

In some embodiments, the candidate set may be re-ranked based on matching user's research topics. That is, if a candidate searches for the same research topics as a particular user, that particular user may see the candidate's name move upwards on the ranked list. In some embodiments, the candidate set may be re-ranked based on freshness of the content. That is, connections that were made years in the past may not be as relevant as connections that were made more recently. As such, newer connections may be re-ranked higher than older connections. In some embodiments, the candidate set may be re-ranked based on content popularity, where the popularity is expressed in terms of articles' citations in a given time window. In some embodiments, the candidate set may be re-ranked based on content popularity, where the popularity is expressed in terms of articles' readership statistics in a given time window from the library. In some embodiments, the candidate set may be re-ranked based on content popularity where the popularity is expressed in terms of articles' share operation in a given in a given time window from the library. In some embodiments, the candidate set may be re-ranked using automatic topic and sentences detection, such as latent dirichlet allocation on usage data (i.e. who reads what) rather than content (i.e. full text of article). In some embodiments, the candidate set may be re-ranked by using dithering noise to the algorithm, which permutes the results in such a way that the top few results have a high probability of remaining in the top few spots, but as one goes deeper into the results, the degree of mixing increases dramatically. In some embodiments, the candidate set may be re-ranked based on usage feedback signals (clicks) provided the users online when accessing the set of recommendation. For example, if a user repeatedly scrolls past a particular name, it may be determined that the user is not interested in that particular candidate, and thus the candidate's name may be moved further down the ranked list. This action may be a form of impression discounting to a scientific research recommender. Impression discounting takes the user's history of impressions (i.e. each time a recommendation is display/served to a user) in order to penalize items that have been recommended often but not interacted with.

Referring to FIGS. 6 and 8, to provide a dynamically ranked list (e.g., a list that is continuously updated to ensure that the ranking is fresh), the steps according to blocks 630-640 may be completed. As such, a determination may be made at block 630 as to whether additional data exists that can be used for re-ranking is obtained. Since data is constantly being obtained and added to the various storage components described herein, additional data may be added continuously. The additional data is not limited by this disclosure, and may generally be any data that can be used to dynamically re-rank the list, including data that is newly received (i.e., received after the initial list is generated). As described herein, examples include a user's relationship to candidate researchers, matching research topics, freshness of content, content popularity (either by citations or readership statistics), automatic topic and sentence detection, adding dithering noise, usage feedback signals (e.g., clicks within the user interface 700), and/or the like.

If additional data does not exist, the originally ranked list is still provided to the user at block 625. If additional data does exist, the list is re-ranked at block 635 according to the additional data and is subsequently provided to the user at block 640. Re-ranking the data may be similar to the ranking process described hereinabove with respect to block 620. Because the re-ranking process is dynamic, the list within the ranked list submenu 810 may be re-ranked whenever new data that can be used for re-ranking is received. As such, it is ensured that the list provides the best possible suggestions to the user, and is constantly updated to ensure that the list always accurately represents a personalized list for that particular user.

In some embodiments, the systems and methods described herein may also apply the same recommendation techniques to the topic of people recommendation for the purposes of discovering relevant researchers in the network of science. Four techniques have been applied: following the people one follows, followed by people one follows, popular in one's subject area, and/or follows one.

While the present disclosure generally relates to finding and ranking researchers and/or potential collaborators, in some embodiments, recommendation techniques may be applied to the topic of discovering relevant jobs for a user matching his/her profile against the job offer. It should be understood that other recommendation techniques may be used according to the present disclosure as well.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of providing recommendations to a user, the method comprising:
   receiving data corresponding to one or more user interactions with a user interface, the one or more user interactions comprising browsing articles within the user interface, which is indicative of a research topic;
   determining, using a trained machine learning algorithm, the research topic from the data corresponding to the one or more user interactions, the machine learning algorithm generating one or more search terms based on the research topic and the one or more user interactions;
   selecting one or more databases to search based on the research topic;
   searching the selected one or more databases for references relating to the research topic using the one or more search terms;
   extracting a plurality of names from the references, the plurality of names corresponding to a plurality of potential collaborators;
   placing the plurality of names into a ranked list, wherein the plurality of names are arranged in the ranked list according to a predicted relevance to a user; and
   providing the ranked list via the user interface to the user.

2. The method of claim 1, further comprising:
   receiving additional data corresponding to one or more of the user, the one or more user interactions, the references, and the plurality of potential collaborators;
   re-ranking the plurality of names based on the additional data to place the plurality of names into a re-ranked list, wherein the plurality of names are arranged in the re-ranked list according to the predicted relevance to the user and the additional data; and
   providing the re-ranked list via the user interface to the user.

3. The method of claim 1, wherein the trained machine learning algorithm extracts search terms from at least one of articles the user has previously added to a personal library, articles the user has published, the user's browsing history, the user's time spent on a website or a portion of the website, actions a user has undertaken via the user interface, and activity of similar users.

4. The method of claim 1, wherein placing the plurality of names into the ranked list comprises at least one of analyzing similarities between the user and each name of the plurality of names, analyzing a relationship between the user and each name of the plurality of names, analyzing whether the user has collaborated with each name, determining a degree of relationship, weighting a relationship, determining a date and time of a relationship, matching research topics, determining freshness of content, determining content, automatically detecting topics and sentences, adding dithering noise, and determining usage feedback signals.

5. The method of claim 1, wherein placing the plurality of names into the ranked list comprises receiving one or more human defined rules for ranking the plurality of names.

6. The method of claim 1, wherein searching the selected one or more databases comprises interfacing with one or more data repositories comprising the references.

7. A system for providing recommendations to a user, the system comprising:
   a processing device; and
   a non-transitory, processor-readable storage medium coupled to the processing device, the non-transitory, processor-readable storage medium comprising one or more programming instructions thereon that, when executed, cause the processing device to:
      receive data corresponding to one or more user interactions with a user interface, the one or more user interactions comprising browsing articles within the user interface, which is indicative of a research topic,
      determine, using a trained machine learning algorithm, the research topic from the data corresponding to the one or more user interactions, the machine learning algorithm generating one or more search terms based on the research topic and the one or more user interactions,
      select one or more databases to search based on the research topic;
      search the selected one or more databases for references relating to the research topic using the one or more search terms,
      extract a plurality of names from the references, the plurality of names corresponding to a plurality of potential collaborators,
      place the plurality of names into a ranked list, wherein the plurality of names are arranged in the ranked list according to a predicted relevance to a user, and
      provide the ranked list via the user interface to the user.

8. The system of claim 7, wherein the one or more programming instructions that, when executed, cause the processing device to search the selected one or more databases further cause the processing device to interface with one or more data repositories comprising the references.

9. The system of claim 7, wherein the one or more programming instructions, when executed, further cause the processing device to:
   receive additional data corresponding to one or more of the user, the one or more user interactions, the references, and the plurality of potential collaborators;
   re-ranking the plurality of names based on the additional data to place the plurality of names into a re-ranked list, wherein the plurality of names are arranged in the re-ranked list according to the predicted relevance to the user and the additional data; and
   provide the re-ranked list via the user interface to the user.

10. The system of claim 7, wherein the trained machine learning algorithm extracts search terms from at least one of articles the user has previously added to a personal library, articles the user has published, the user's browsing history, the user's time spent on a website or a portion of the website, actions a user has undertaken via the user interface, and activity of similar users.

11. The system of claim 7, wherein the one or more programming instructions that, when executed, cause the processing device to place the plurality of names into the ranked list further cause the processing device to complete at least one of analyzing similarities between the user and each name of the plurality of names, analyzing a relationship between the user and each name of the plurality of names, analyzing whether the user has collaborated with each name, determining a degree of relationship, weighting a relationship, determining a date and time of a relationship, matching research topics, determining freshness of content, determining content, automatically detecting topics and sentences, adding dithering noise, and determining usage feedback signals.

12. The system of claim 7, wherein the one or more programming instructions that, when executed, cause the processing device to place the plurality of names into the ranked list further cause the processing device to receive one or more human defined rules for ranking the plurality of names.

13. A non-transitory, processor-readable storage medium programmed to provide recommendations to a user, the non-transitory, processor-readable storage medium comprising one or more programming instructions that are executable to:
receive data corresponding to one or more user interactions with a user interface, the one or more user interactions comprising browsing articles within the user interface, which is indicative of a research topic;
determine, using a trained machine learning algorithm, the research topic from the data corresponding to the one or more user interactions, the machine learning algorithm generating one or more search terms based on the research topic and the one or more user interactions,
select one or more databases to search based on the research topic;
search the selected one or more databases for references relating to the research topic using the one or more search terms;
extract a plurality of names from the references, the plurality of names corresponding to a plurality of potential collaborators;
place the plurality of names into a ranked list, wherein the plurality of names are arranged in the ranked list according to a predicted relevance to a user; and
provide the ranked list via the user interface to the user.

14. The storage medium of claim 13, wherein the one or more programming instructions that are executable to place the plurality of names into the ranked list are further executable to receive one or more human defined rules for ranking the plurality of names.

15. The storage medium of claim 13, wherein the one or more programming instructions that are executable to search the selected one or more databases are further executable to cause a processing device to interface with one or more data repositories comprising the references.

16. The storage medium of claim 13, wherein the one or more programming instructions are further executable to:
receive additional data corresponding to one or more of the user, the one or more user interactions, the references, and the plurality of potential collaborators;
re-ranking the plurality of names based on the additional data to place the plurality of names into a re-ranked list, wherein the plurality of names are arranged in the re-ranked list according to the predicted relevance to the user and the additional data; and
provide the re-ranked list via the user interface to the user.

17. The storage medium of claim 13, wherein the trained machine learning algorithm extracts search terms from at least one of articles the user has previously added to a personal library, articles the user has published, the user's browsing history, the user's time spent on a web site or a portion of the web site, actions a user has undertaken via the user interface, and activity of similar users.

18. The storage medium of claim 13, wherein the one or more programming instructions that are executable to place the plurality of names into the ranked list are further executable to complete at least one of analyzing similarities between the user and each name of the plurality of names, analyzing a relationship between the user and each name of the plurality of names, analyzing whether the user has collaborated with each name, determining a degree of relationship, weighting a relationship, determining a date and time of a relationship, matching research topics, determining freshness of content, determining content, automatically detecting topics and sentences, adding dithering noise, and determining usage feedback signals.

* * * * *